US009099155B1

(12) United States Patent
Kataria et al.

(10) Patent No.: US 9,099,155 B1
(45) Date of Patent: Aug. 4, 2015

(54) ADAPTIVE MITIGATION OF ADJACENT TRACK INTERFERENCE (ATI) ON A RECORDING MEDIUM

(71) Applicant: Seagate Technology LLC, Cupertino, CA (US)

(72) Inventors: Abhay Kataria, Longmont, CO (US); Michael D. Schaff, Longmont, CO (US); Sandeep Bhushan, Longmont, CO (US); Kevin M. Bailey, Belle Plaine, MN (US); Phillip Kevin McGinnis, Lafayette, CO (US); Mai Ghaly, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/448,844

(22) Filed: Jul. 31, 2014

(51) Int. Cl.

| | |
|---|---|
| ***G11B 27/36*** | (2006.01) |
| ***G11B 5/09*** | (2006.01) |
| ***G11B 20/10*** | (2006.01) |
| ***G11B 5/02*** | (2006.01) |
| *G11B 5/55* | (2006.01) |
| *G11B 20/18* | (2006.01) |

(52) U.S. Cl.
CPC ............ *G11B 20/10212* (2013.01); *G11B 5/02* (2013.01); *G11B 5/09* (2013.01); *G11B 27/36* (2013.01); *G11B 5/5565* (2013.01); *G11B 20/18* (2013.01)

(58) Field of Classification Search
None
See application file for complete search history.

(56) References Cited

U.S. PATENT DOCUMENTS

| | | | | |
|---|---|---|---|---|
| 7,095,577 | B1 | 8/2006 | Codilian et al. | |
| 7,345,837 | B1 | 3/2008 | Schreck et al. | |
| 7,672,072 | B1 | 3/2010 | Boyle et al. | |
| 7,747,907 | B2 | 6/2010 | Olds et al. | |
| 7,797,335 | B2 | 9/2010 | Stern et al. | |
| 7,974,029 | B2 | 7/2011 | Tsai et al. | |
| 8,174,780 | B1 * | 5/2012 | Tsai et al. | 360/31 |
| 8,331,053 | B2 | 12/2012 | Hobbet | |
| 8,516,597 | B1 | 8/2013 | Sharma et al. | |
| 8,711,499 | B1 | 4/2014 | Desai et al. | |
| 2005/0180267 | A1 | 8/2005 | Jeong et al. | |
| 2005/0193250 | A1 | 9/2005 | Takeuchi et al. | |
| 2007/0076315 | A1 | 4/2007 | McMurtrey | |
| 2008/0198492 | A1 | 8/2008 | Ahn | |
| 2009/0244775 | A1 | 10/2009 | Ehrlich | |
| 2013/0185498 | A1 | 7/2013 | Islam et al. | |

* cited by examiner

*Primary Examiner* — Andrew L Sniezek
(74) *Attorney, Agent, or Firm* — Hall Estill Attorneys at Law

(57) ABSTRACT

Apparatus and method for adaptively mitigating adjacent track interference (ATI) effects on a data recording medium. In some embodiments, a write count value is accumulated for a first track responsive to successive writes to a second track on the data recording medium. For each of the successive writes, the accumulated write count value for the first track is incremented by a different variable amount based on temperature. The first track is refreshed responsive to the accumulated write count reaching a selected threshold value.

20 Claims, 4 Drawing Sheets

| TRACK ID | WRITE COUNT | THRESHOLD |
|---|---|---|
| 1 | 25 | A |
| 2 | 0 | A |
| 3 | 1794 | A |
| 4 | 516 | B |
| ⋮ | ⋮ | ⋮ |
| M-1 | 2703 | A |
| M | 147 | C |

| BAND ID | WRITE COUNT |
|---|---|
| 1 | 1 |
| 2 | 3 |
| 3 | 0 |
| 4 | 9 |
| ⋮ | ⋮ |
| P-1 | 2 |
| P | 6 |

ADAPTIVE MITIGATION OF ADJACENT TRACK INTERFERENCE (ATI) ON A RECORDING MEDIUM

SUMMARY

Various embodiments of the present disclosure are generally directed to an apparatus and method for adaptively mitigating adjacent track interference (ATI) effects on a data recording medium.

In some embodiments, a method includes accumulating a write count value for a first track responsive to successive writes to a second track on a data recording medium. For each of the successive writes, the accumulated write count value for the first track is incremented by a different variable amount based on temperature. The first track is refreshed responsive to the accumulated write count reaching a selected threshold value.

In further embodiments, an apparatus includes a data recording medium on which a plurality of concentric tracks is defined. A read/write transducer has a write element adapted to write data to the tracks and a read element adapted to read data from the tracks. An ATI control block maintains, in a memory, a data structure which tabulates write counts for at least selected ones of the tracks responsive to write operations carried out by the write element. The respective tabulated write counts are incremented responsive to the write operations by variable increment amounts based on temperature.

In still further embodiments, an apparatus has a data recording medium on which a plurality of concentric tracks is defined. A read/write transducer has a write element adapted to write data to the tracks and a read element adapted to read data from the tracks. A temperature sensor outputs temperature measurements indicative of ambient temperatures adjacent the medium. An ATI control block accumulates, in a memory, a write count value for a first track on the medium responsive to successive writes by the write element to a second track on the medium. For each of the successive writes, the accumulated write count value for the first track is incremented by a different variable amount based a concurrent temperature measurement from the temperature sensor. The control block is further operative to schedule a refreshing of data stored on the first track responsive to the accumulated write count reaching a selected threshold value.

These and other features and advantages which characterize various embodiments of the present disclosure can be understood in view of the following detailed discussion and the accompanying drawings.

DETAILED DESCRIPTION

Figure 1:
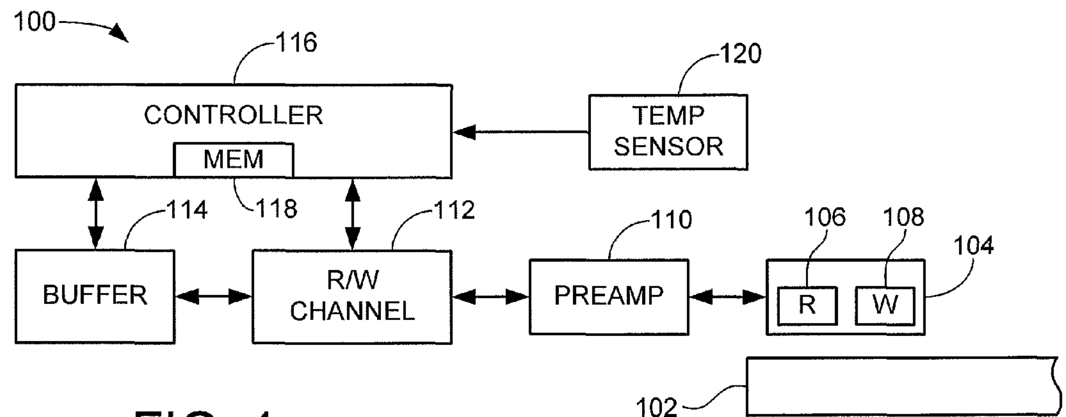
FIG. 1 provides a functional block representation of a data storage device in accordance with various embodiments of the present disclosure.

Various embodiments of the present disclosure are generally directed to the adaptive mitigation of adjacent track interference (ATI) in a data storage device in relation to various operational parameters such as changes in operational temperature of the device.

Data storage devices store computerized data in a fast and efficient manner. Some data storage devices employ one or more magnetic recording media which are rotated at a selected rotational velocity. A corresponding array of read/write transducers (heads) radially advance across the media to write data to and read data from concentric tracks defined on the media surfaces.

Adjacent track interference, also sometimes referred to as adjacent track erasure (ATE), is a phenomenon that can adversely affect the recovery of data from rotatable media. Generally, ATI tends to arise over multiple successive write operations where magnetic fringe fields from a write element of the transducer partially encroach (e.g., overwrite) the data written to one or more immediately adjacent tracks. If sufficiently pronounced, this encroachment can degrade the magnetization patterns written to the adjacent track(s) to an extent that the data storage device cannot reliably recover the data from the tracks.

Some data storage devices maintain write counts for at least selected tracks on a data recording medium to accumulate total numbers of successive write operations to those tracks. Once the write count for a particular track reaches a predetermined threshold, corrective action may be taken such as by refreshing (reading back and then rewriting) the data on the track. If the data are refreshed, the refresh data may be rewritten to the same track or relocated to a new track.

These and other processes are often designed to reduce the effects of ATI by selecting thresholds that are sufficiently low so as to ensure the data on the affected tracks can still be successfully recovered once the thresholds are reached. While operable, the continuing trend of providing storage devices with ever increasing data track densities and different recording schemes presents a need for improvements in the manner in which ATI effects are mitigated.

Accordingly, various embodiments of the present disclosure provide an apparatus and method for ATI mitigation that addresses these and other limitations of the art. As explained below, some embodiments provide an ATI management circuit which accumulates write count values for various tracks on a data recording medium.

The write count values are incremented by variable amounts for each of the write operations applied to the tracks. The variable increment amounts are based on a measured temperature associated with the device during such write operations. Corrective action is taken response to the accumulated write count reaching a selected threshold, such as an evaluation of the affected track and refreshment of the data as required.

Higher write count increments may be supplied for relatively higher temperatures, and lower write count increments may be supplied for relatively lower temperatures. Other parameters such as track misregistration (TMR), observed bit error rates (BER), write element asymmetry, etc., can also be included in the ATI assessment.

In this way, the accumulated data will more accurately reflect the amount of degradation present on the respective tracks due to successive writes. This provides an adaptive system that reduces unnecessary evaluations, and more quickly and accurately detects areas that require immediate ATI mitigation to avoid data loss.

These and other features and advantages of various embodiments of the present disclosure can be understood beginning with a review of FIG. 1 which provides a functional block representation of an exemplary storage device 100. The device 100 is characterized as a hard disc drive (HDD) to which data are stored on a rotatable magnetic data recording medium (disc) 102, although this is merely exemplary and not limiting. In some embodiments, the device 100 can be designed as a two dimension magnetic recording (TDMR) or a multi-signal magnetic recording (MSMR) device.

The medium 102 is accessed by a data read/write transducer (head) 104 which is supported adjacent the rotating medium during device operation. The head 104 includes one or more read elements (R) 106 and one or more write elements (W) 108. The head 104 can include other functional elements as well such as fly-height control heaters, contact and/or proximity sensors, etc.

A preamplifier/driver circuit (preamp) 110 applies signal preconditioning and preamplification to read signals from the read element(s) 106 during data read operations, and supplies bi-directional write currents to the write element(s) 108 during data write operations. A read/write (R/W) channel 112 provides data encoding/decoding, a buffer memory 114 provides temporary storage of data during data transfer operations, and a controller 116 provides top level control of the device 100. The controller 116 may constitute a programmable processor that uses programming steps and control parameters in local controller memory 118. The controller functionality may alternatively be realized in hardware and/or incorporated into the other operative blocks shown in FIG. 1.

One or more temperature sensors 120 supplies temperature measurement values to the controller 116 indicative of ambient temperatures of the device 100 during operation. The use of these and other measurement values obtained during the operation of the device will be discussed in greater detail below.

Figure 2:
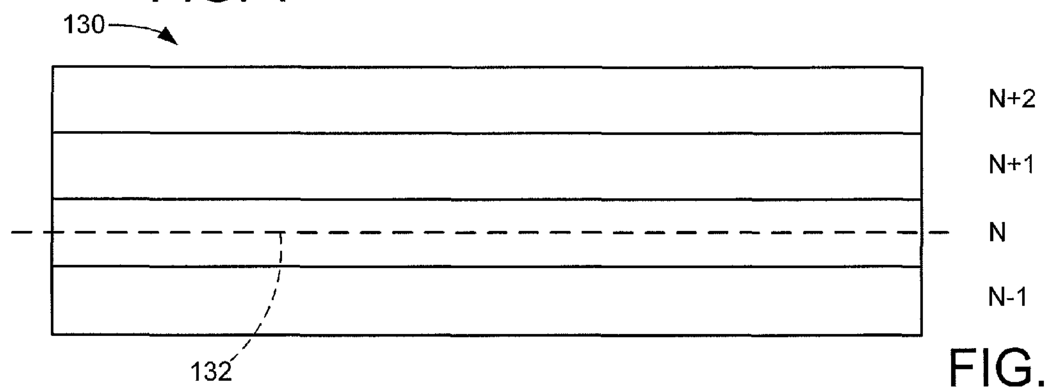
FIG. 2 shows a number of standard (non-shingled) tracks on a storage medium that can be incorporated into the storage device of FIG. 1.

FIG. 2 illustrates a number of adjacent concentric tracks 130 that may be formed on the storage medium 102 of FIG. 1 in accordance with some embodiments. The tracks 130 are arbitrarily denoted as Tracks N−1, N, N+1 and N+2 where N is an integer. It will be appreciated that FIG. 2 only shows a small subset of the concentric tracks that can extend from the innermost diameter (ID) to the outermost diameter (OD) of the medium. The tracks 130 are characterized as standard, non-shingled tracks so that data write operations can be carried out to any of the respective tracks in any order without the need to reformat the tracks (apart from periodic refreshing operations carried out responsive to the detection of ATI).

A track centerline for Track N is represented by broken line 132. During a write operation to Track N, the associated write element 108 (FIG. 1) will be positioned so as to be nominally centered over this centerline as the medium rotates adjacent the head 104. It will be appreciated that some amount of track misregistration (TMR), or positional offset, may be experienced by the write element 108 so that the write element may deviate from the centerline 132 somewhat during the write operation. TMR can arise due to a variety of factors including written-in error, vibratory effects, windage, etc. The TMR can be broken into repeatable runout (RRO), which is repeated during every revolution of the media, and non-repeatable runout (NRRO), which varies over each revolution of the medium.

Write fault thresholds, also sometimes referred to as off-cylinder limits (OCLIMs), may be established on opposing sides of the centerline 132. Should the write element 108 exceed a specified OCLIM threshold, a write fault interrupt may be declared and further writing is temporarily suspended until the position error of the head 104 can be corrected. Example OCLIM thresholds may be on the order of about ±15% of the track width, although other values can be used. It will be appreciated that during a subsequent read operation, the read element 106 will generally be positioned to follow the centerline 132 as well.

The write element 108 writes data to Track N (and to each of the other tracks) by using magnetic write fields that establish a magnetic sequence (pattern) in one or more internal recording layers of the media 102. Due to a variety of factors such as the shape and construction of the write element and the position of the write element relative to the centerline of Track N, relatively small magnetic fringing fields may tend to encroach onto the edge portions of the adjacent Tracks N−1 and N+1.

A single write operation to Track N may result in magnetic fringing fields that have little, if any, practical effect upon the magnetization patterns of Tracks N−1 and N+1. Over time, however, the accumulated effects of the fringing fields from multiple successive writes to Track N can reach the point where the magnetization patterns of the adjacent Tracks N−1 and N+1 become degraded.

As will be explained below, the controller 116 (FIG. 1) maintains accumulated write count values for the tracks 130. In some embodiments, a separate write count value is maintained for each of the Tracks N−1, N, N+1 and N+2. In other embodiments, write count values are accumulated for sets of tracks (e.g., one count for Tracks N−1 and N, another count for Tracks N+1 and N+2, etc.).

Other variations are contemplated. A single write count may be provided for all four Tracks N−1, N, N+1 and N+2. Conversely, multiple write counts can be maintained for a single track. Track N may have a first write count for writes along a first portion of the track and a different write count for writes along a second portion of the track. Alternatively, Track N may have a first write count value for writes provided to adjacent Track N−1 and a second write count value for writes provided to adjacent track N+1. These and other variations can readily be implemented as required.

Regardless of the scheme, each time a write operation is carried out to a selected track, a first write count value associated with the selected track is reset to a baseline value, such as zero (0) or some other baseline value. The resetting of the write count is based on the observation that once a track receives new data, the effects of any previously applied fringing fields to that track from adjacent tracks will be substantially eliminated since the newly written data “resets” any previously encroached portions of the track.

At the same time, the accumulated write count value for one or more adjacent tracks is incremented by a selected amount to reflect that fact that the writing of data produces fringing fields that may degrade these adjacent tracks. Thus, a write operation to Track N in FIG. 2 might result in the resetting of the write count value for Track N, and the incrementing of the write counts for adjacent Tracks N−1 and N+1.

Figure 3:
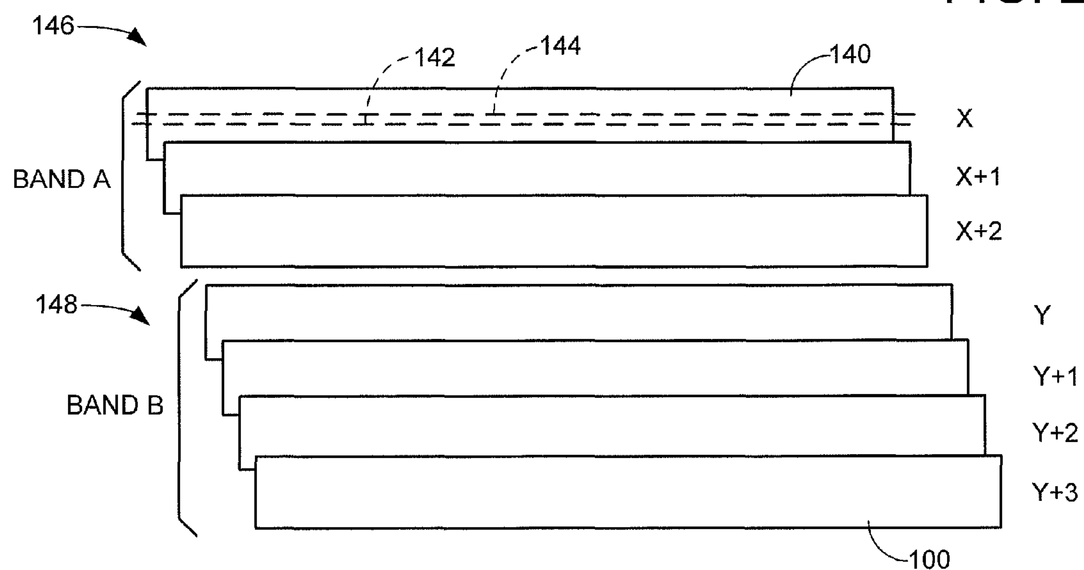
FIG. 3 shows a number of shingled tracks on a storage medium that can be incorporated into the storage device of FIG. 1.

FIG. 3 illustrates another number of adjacent tracks 140 that may be formed on the storage medium 102 of FIG. 1 in accordance with some embodiments. The tracks 140 are characterized as shingled (partially overlapping) tracks written using a shingled magnetic recording (SMR) technique. Unlike the non-shingled tracks 130 in FIG. 3, the shingled tracks 140 are written in a specified order and generally cannot be written in any random order without requiring the reformatting of previously written tracks. A shingled track 140 uses a first centerline such as 142 to position the write element 108 for the writing of data and uses a different, second centerline such as 144 to position the read element 106 to subsequently read the data, with the second centerline taking into account the partial overlapping of the track by the immediately adjacent track.

The tracks 140 are shown to be arranged in two concentric bands 146, 148 denoted as Band A and Band B. Band A has three (3) tracks denoted as Tracks X, X+1 and X+2. Band B has four (4) tracks denoted as Tracks Y, Y+1, Y+2 and Y+3. Any number of bands, and any respective numbers of tracks in each band, can be provided on the storage medium 102. Both shingled and non-shingled tracks can be formed in different radial zones on the same medium as desired.

It will be apparent from a review of FIG. 3 that, within Band A, Track X is written first, Track X+1 is written next, and Track X+2 is written last. A similar ordering is provided in Band B with Track Y being written first and Track Y+3 being written last. Each subsequently written track partially overlaps an immediately previously written track in the associated band. Such SMR techniques take advantage of the fact that the effective operational width of a read element (e.g., read element 106 in FIG. 1) will generally tend to be narrower than the effective operational width of a write element (e.g., write element in FIG. 1). Hence, greater data storage densities can be achieved for a given recording surface area, albeit at the expense of greater processing control requirements.

Shingled tracks such as 140 in FIG. 3 do not tend to have the same types of fringing field effects as are experienced with non-shingled tracks such as 130 in FIG. 2. This is because the tracks in a given band are often treated as a unit. The updating of data in Band A, for example, may result in the rewriting of some or all of the tracks in the band in order to maintain the relative ordering. To update the data stored on Track X+1, the device 100 may operate to read and temporarily buffer the data stored on Track X+2, followed by writing the new data to Track X+1 and rewriting the temporarily buffered data back to Track X+2. It will be noted that updates to Track X+2 (and Track Y+3) do not require the reformatting of other tracks in their respective bands.

Even though shingled tracks such as 140 tend to be rewritten more frequently as compared to non-shingled tracks such as 130, ATI effects from fringing fields and other effects can still degrade the ability to recover data from the tracks 140. Indeed, because the tracks are relatively narrower, ATI effects can sometimes be greater than with wider, non-shingled tracks, particularly for tracks located adjacent track boundaries (such as Track Y in Band B).

When used, the controller 102 accumulates and maintains write count values for the tracks 140 in FIG. 3. The write count values can be on a per track basis, a per band basis, for specific tracks within each band (such as the first track or the last track, etc.). In one embodiment, writes to the last track in a given band, such as Track X+2 in Band A, result in the resetting of the write count value for that track and an increment of a write count value for a first track in the next band, such as Track Y in Band B.

Figures 4, 5A, 5B:
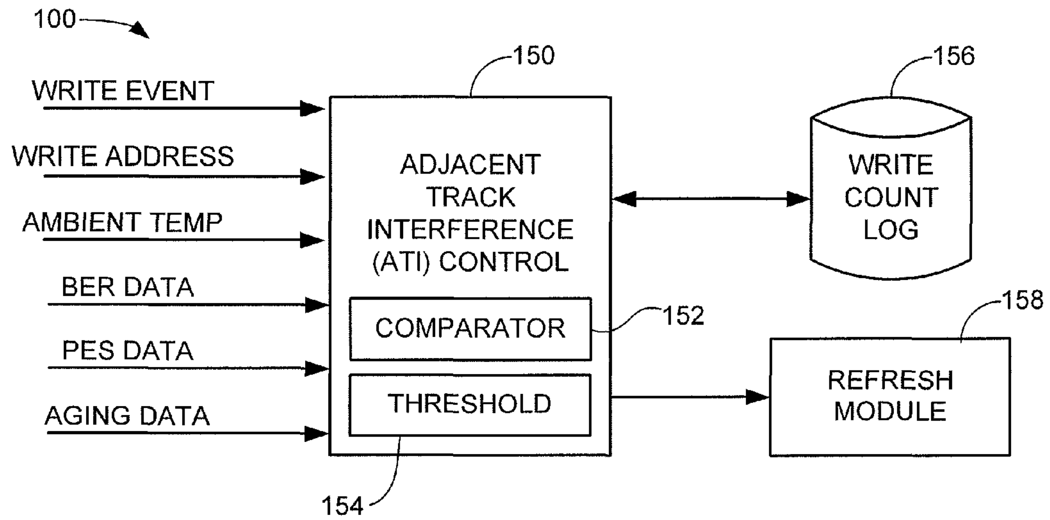
FIG. 4 depicts an adjacent track interference (ATI) control block of the data storage device of FIG. 1 in accordance with some embodiments.
FIG. 5A provides an exemplary format for a first write count log data structure generated and maintained by the control block of FIG. 4 in accordance with some embodiments.
FIG. 5B provides an exemplary format for a second write count log data structure generated and maintained by the control block of FIG. 4 in accordance with other embodiments.

FIG. 4 is a functional block representation of an adjacent track interference (ATI) control block 150 adapted in accordance with various embodiments to maintain write count values for various types of tracks in the storage device 100 such as the non-shingled tracks 130 in FIG. 2 and the shingled tracks 140 in FIG. 3. The control block 150 can be realized in software, hardware and/or firmware. In some embodiments, the control block 150 forms a portion of the controller 116 in FIG. 1.

The control block 150 operates in conjunction with a number of internal and external modules, including a comparator circuit 152, a threshold management circuit 154, a write count log data structure 156 and a refresh module 158. Other configurations can be used so the arrangement of FIG. 4 is merely exemplary and is not limiting.

The control block 150 receives a number of inputs from other portions of the storage device 100. Exemplary types of inputs can include write event indications, write address data, ambient temperature (temp) measurements, bit error rate (BER) data, position error signal (PES) data, memory location aging data and/or data aging data. Not all of these inputs are necessary for the operation of the control block 150, and other inputs can be provided.

Each time that a write operation is carried out to write data to the medium 102 (see FIG. 1), the control block 150 is notified via the write event indication input. The corresponding write address is supplied so that the control block 150 can determine which track or group of tracks is receiving the write data during the write operation.

In response, the control block 150 accesses the accumulated write count values from the data structure 156 for the affected tracks. The write count values for the tracks to which data are written during write operations are reset to a baseline value, and the write count values for adjacent tracks are incremented by variable amounts. Each newly incremented write count value is subjected to a comparison operation using the comparator 152 and a suitable threshold value from the threshold module 154. As a result of the comparison, should the newly incremented write count value reach the threshold value, the refresh module 158 schedules suitable corrective action such as evaluation of the affected track for ATI degradation and the refreshing of the data thereon as required.

The variable amount of increment added to the accumulated write count value for each adjacent track is a function of the ambient temperature at the time of the write event. This information can be supplied by the temperature sensor 120 (FIG. 1). In some embodiments, the incremented amount may also be adjusted based on other parameters such as BER, PES and/or aging levels. These and other considerations will be discussed more fully below.

FIGS. 5A and 5B show different exemplary formats for the write count log data structure 156 of FIG. 4. Other formats can be used. It will be appreciated that the formats of FIGS. 5A and 5B are limited to a single magnetic recording surface. Devices with multiple magnetic recording surfaces and multiple heads can use an expanded format so that individual head/disc combinations, etc. are included in the address descriptor information.

FIG. 5A is suitable for non-overlapping tracks such as in FIG. 2 wherein individual write counts are maintained for each of the tracks 130. As shown in FIG. 5A, a first column shows each of the associated tracks from 1 to M. A corresponding write count value in a second column shows the total accumulated write counts for the tracks. From FIG. 5A it can be seen, for example, that Track 2 has a write count of zero (0). It follows that data were recently written to Track 2, and no subsequent write events have been applied to adjacent Tracks 1 and 3 after Track 2 was written.

While the same write count threshold can be applied to all of the tracks, the third column in FIG. 5A provides different thresholds (generically identified as respective Thresholds A, B and C) for different tracks. Different thresholds can be used for a variety of reasons including the status of data (e.g., higher priority data v. lower priority data), aging, BER trends, media defects, etc. In some embodiments, the control block 150 operates to adaptively adjust the thresholds based on inputs such as illustrated in FIG. 4.

The magnitude of the threshold or thresholds used for non-shingled tracks can take any suitable value(s). For purposes of illustration and without limitation, one exemplary value may be on the order of about 3,000 writes. That is, once a write count value for a given track reaches 3,000, the refresh module 158 evaluates and refreshes the track as required. It is contemplated that suitable threshold values can be derived based on empirical observations, history data (e.g., success in recovering data once thresholds are reached), device construction characteristics, risk assessment levels, data priority values, device and/or data aging parameters, etc.

It is contemplated that the format of FIG. 5A provides write counts for individual tracks. Alternatively, the Track ID values can describe groups of tracks, zones, portions of tracks, etc. While each Track ID has only a single write count value, multiple write count values can be maintained for individual IDs.

The table structure can describe all of the tracks in the storage device irrespective of whether write operations have been carried out to those tracks. Alternatively, the table can be populated over time as writes are performed by the system, so that the table only lists tracks to which user data have been written at least once.

FIG. 5B shows another exemplary format for the write count log data structure of FIG. 4. The format in FIG. 5B is suitable for shingled-tracks such as illustrated in FIG. 3. As before, other types of information can be included into the table.

The first column in FIG. 5B provides a Band ID indicator for Bands 1-P. The second column provides a single write count value for each of the bands. In some embodiments, the write count value is incremented solely for writes to the last track in each band (see e.g., Track X+2 in Band A and Track Y+3 in Band B in FIG. 3). In other embodiments, the write count may represent all writes to the band irrespective of which track or tracks within the band have been written. Alternatively, individual write counts can be provided for each track in each band, etc.

FIG. 5B shows accumulated write count values that are significantly lower than the write count values in FIG. 5A. This is due in part to the nature of shingled tracks, which necessarily tend to involve more refreshing operations than non-shingled tracks. No threshold values are shown in FIG. 5B on the basis that the same threshold is applied to all of the bands. Different thresholds can be assigned to different bands in a manner similar to FIG. 5A.

Without limitation, an exemplary threshold for shingled tracks may be on the order of around 10. Hence, once the write count values in FIG. 5B reach 10, the refresh module 158 operates to evaluate and, as necessary, refresh the data.

Figure 6:
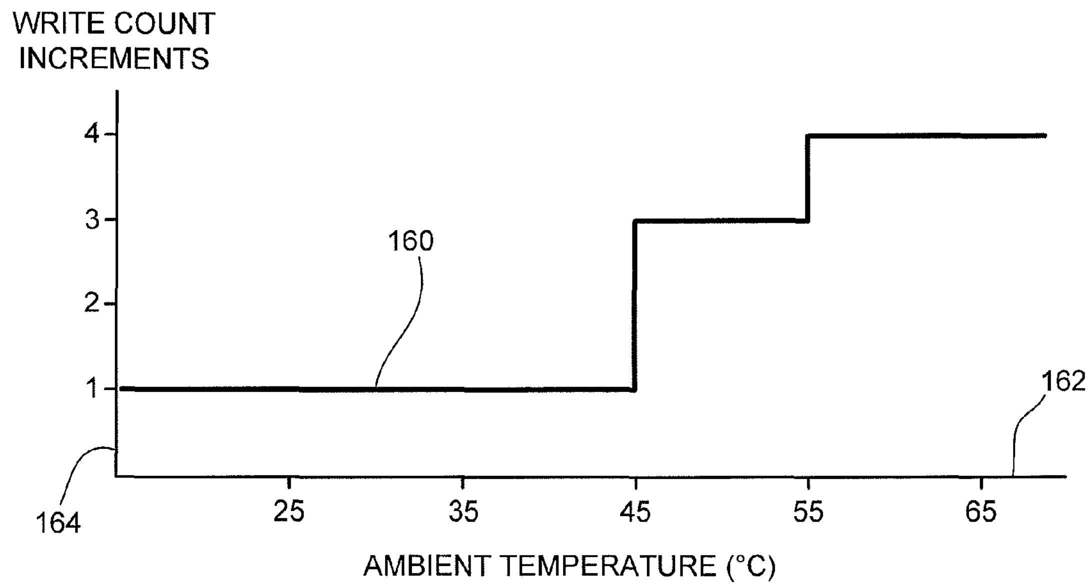
FIG. 6 is a graphical representation of a discrete write count increment curve used by the control block of FIG. 4 in some embodiments.

FIG. 6 shows a temperature increment curve 160 used by the control block 150 to determine suitable increments for the write count log data structures of FIGS. 5A and 5B in accordance with some embodiments. The curve 160 is plotted against an ambient temperature x-axis 162 and a write count increment amount y-axis 164.

The curve 160 has a discrete, step-wise format. Temperatures below a measured temperature of 45 degrees Celsius (45° C.) provide an increment value of one (1). Temperatures from 45° C. to 55° C. provide an increment value of three (3), and temperatures above 55° C. provide an increment value of four (4). Other increment values and temperature range combinations can be used.

Generally, higher temperatures result in successively higher increments of the respective write counts. To give an illustrative example using the table of FIG. 5A, assume that the write event to Track 2 that resulted in the zeroing out of the write count value for this track took place at a temperature below 45° C. Under this scenario, the write count for Track 1 would have been increased by one increment from 24 to the current value of 25, and the write count for Track 3 would have been increased by one increment from 1793 to the current value of 1794. On the other hand, if the temperature during the write to Track 2 was at 51° C., Track 1 would have been incremented from 22 to 25 and Track 3 would have been incremented from 1791 to 1794. A temperature of 60° C. would have provided increments of from 21 to 25 and from 1790 to 1794 for Tracks 1 and 3.

FIG. 6 thus employs a "bucket" approach so that the system defines a number of temperature ranges (buckets) with different assigned increment values, identifies the bucket in which the current temperature falls, and applies the corresponding variable increment amount.

Figure 7:
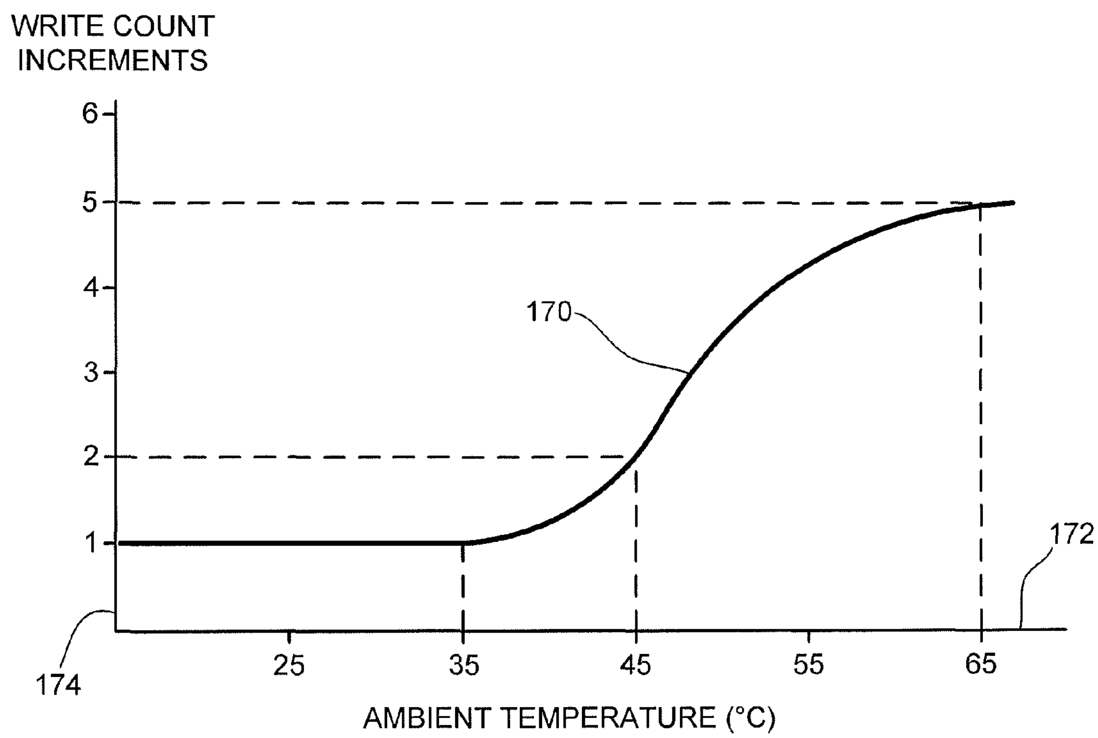
FIG. 7 is a graphical representation of a continuous write count increment curve used by the control block of FIG. 4 in other embodiments.

FIG. 7 shows another temperature increment curve 170 that can be used by the control block 150. The curve 170 is a continuous curve plotted against a temperature x-axis 172 and write count magnitude y-axis 174. The curve can be defined using a suitable mathematical formula, a look up table, etc. Other shapes and scaling factors can be used.

The curve 170 provides an increment of one (1) up to about 35° C., increases to an increment of two (2) at about 45° C., and increases to an increment of five (5) at about 65° C. Because the table formats of FIGS. 5A and 5B list the write counts in integers, the amount of increment can be rounded up or down to the closest whole number.

Because the control block 150 applies variable increments, refresh decisions are based on the relative magnitudes of the accumulated counts and the thresholds, not necessarily the absolute number of writes that have taken place adjacent a particular track. Higher resolution values can thus be obtained by scaling both the write count values and the thresholds.

Instead of providing an increment of one (1) for temperatures below 35° C., the baseline in FIG. 7 could be assigned some other value, such as an increment of five (5). Thus, for each write at or below 35° C., the associated write count(s) would be increased by five (5). Temperatures of 40° C. would give an increment of seven (7), 45° C. would result in an increment of 10, temperatures at 65° C. would provide increments of 25, and so on. Similar scaling can be applied to the stepwise approach of FIG. 6. The relative contribution to ATI can be assessed in relation to temperature to define a suitable shape for the final increment curve.

Additional parameters can be taken into account when determining a suitable variable increment value. For example, writes that take place in the presence of excessive amounts of vibration or other disturbances may result in a higher weighting being applied to write count increments for the adjacent tracks. The declaration of a write fault during the writing of one track may result in an additional incremental value being applied to the track located in the direction of the write fault. Aging of the data and/or the memory location, degraded BER trends, etc. can also be used to derive appropriate write count increments. In one embodiment, an overall increment value I can be derived in accordance with the following relation:

$$I=C1(T)+C2(\text{PES})+C3(\text{AGING})+C4(\text{BER}) \quad (1)$$

where T is a parameter based on the measured temperature, PES is a parameter indicative of write disturbance (such as average PES during the write), AGING is a parameter relating to data and/or device memory aging, BER is a parameter indicative of recent BER measurements and/or trends in a region of interest in the memory, and C1, C2, C3 and C4 are constants (weighting factors). The approach represented by equation (1) is merely illustrative of a number of ways in which variable write count increments can be generated, so that the equation is merely exemplary and is not limiting.

Figure 8:
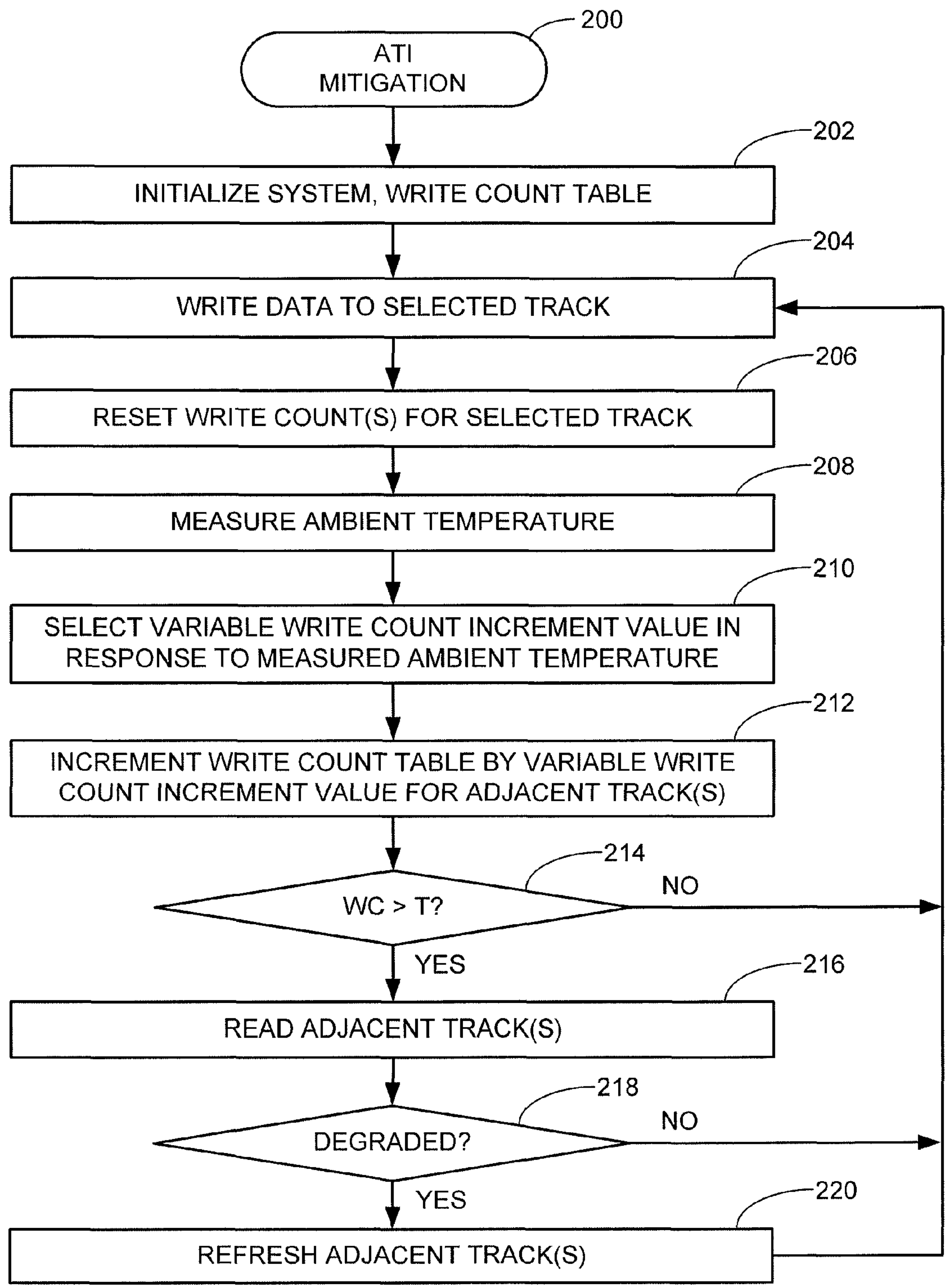
FIG. 8 is a flow chart for an ATI mitigation routine illustrative of steps carried out in accordance with some embodiments of the present disclosure.

FIG. 8 provides an ATI mitigation routine 200 generally illustrative of various steps that may be carried out in accordance with the foregoing discussion. The steps in FIG. 8 are merely exemplary and can be modified, omitted, performed in a different order, and other steps can be added as required. For purposes of illustration, FIG. 8 will be discussed in terms of the operation of the control block 150 of FIG. 5 which tabulates write counts in a format corresponding to FIG. 5A for non-shingled tracks as in FIG. 2.

The storage device 100 (FIG. 1) is initialized at step 202, including the loading and formatting of an appropriate write count table as in FIG. 5A in a local memory. The storage device commences normal operation during which, from time to time, a write command is received and processed as indicated at step 204.

It is contemplated that the write command will be received from a host device along with the associated write data, the latter of which may be temporarily stored in the buffer 114 (FIG. 1). Writeback processing may be used so that the device 100 immediately provides a command complete indication to the requesting host, and then schedules a write operation for the data at an appropriate time.

The input writeback data are thereafter retrieved from the buffer 114 and written to one or more selected tracks. For purposes of the present discussion, it will be contemplated that step 204 writes the data to Track N in FIG. 2 during this first pass through the routine. The write count value for Track N is reset to the base value (in this case, zero) at step 206.

One or more ambient temperature measurements are obtained in conjunction with the writing of the data to Track N at step 208, such as from the temperature sensor 120 in FIG. 1. The temperature measurements can be taken before, during or after the write event, but will be sufficiently "concurrent" with the writing of the data as to generally reflect the temperature at the time of writing. Multiple temperature measurements (from the same sensor or from multiple sensors) may be obtained and combined to derive a final combined temperature level.

The control block 150 proceeds at step 210 to select a variable write count increment value based on the measured temperature value from step 206. Using the exemplary curve 160 in FIG. 6, an increment of one (1), three (3) or four (4) will be selected based on which temperature bucket the measured temperature falls. In some embodiments, other scaling mechanisms can be used, including scaling mechanisms that take additional parameters into account such as discussed above in equation (1).

Regardless, once a variable write count increment value is selected, the routine passes to step 212 where the existing write count value is incremented by the selected amount for one or more tracks adjacent to the selected track. For example, the existing write count values for Tracks N−1 and N+1 in FIG. 2 may be respective incremented by the increment value identified in step 210. In other embodiments, the write count for only a single adjacent track (e.g., Track N+1) is incremented.

Different increment amounts may be supplied to different tracks. Due to asymmetric write characteristics of the write element 108 (FIG. 1), a track that experiences greater amounts of fringing fields or other effects, such as Track N−1, may receive a higher increment value than another track (e.g., Track N+1). While it is contemplated that the incremented track(s) will be immediately adjacent the selected track to which data was written, such is merely exemplary and is not necessarily limiting. The writing of data to Track N may result, for example, in an increment being added to Track N+2, etc.

The flow continues to decision step 214 where one or more write count (WC) values from the write count data structure are compared to an associated threshold (T). The comparison can take place immediately upon the application of the increment value(s) to the adjacent track(s), but such is not necessarily required. From a processing standpoint, it may be more efficient to compare all values in the table to the respective threshold(s) on a periodic basis, rather than performing the comparison immediately at the conclusion of each write count update.

If the comparison step determines that the applicable write counts (WC) do not exceed the applicable threshold(s) (T), the routine returns to step 204 to process the next write command. Should one or more of the write counts reach the applicable threshold(s), the flow continues to step 216 where the control block 150 passes control to the refresh module 158 (FIG. 5) which schedules a read operation upon the adjacent track(s).

The processing applied to the track(s) under evaluation will depend on the requirements of a given application. In some cases, if an evaluated track can be read back with no errors, the system may determine that the track has suffered little or no ATI degradation and so no further operations are applied. This is indicated by decision step 218. If degradation is detected, the track is refreshed at block 220. The refresh operation may constitute the rewriting of the data obtained from step 216 back to the same track, or the writing of the data to a new, different track.

While not specifically shown in FIG. 8, the refreshing of a degraded track will also result in the resetting of the associated write count value back to the base level (e.g., zero or other suitable value). In some embodiments, the write count value is reset irrespective of whether the track was found to be degraded, so that the adjacent track has a write count value reset to zero (or other base level) at step 216.

In other embodiments, if a track is found to not have been degraded, the write count value is maintained at its current level. This approach allows the system to continue to accumulate write count increments to obtain empirical data with regard to system operation. It will be appreciated that this will tend to increase the rate at which that particular track is evaluated during steps 214 through 220 since the write count value remains above the threshold. However, by allowing the write count to continue to increase until degradation is detected, this will provide valuable data that can allow the system to adjust subsequent thresholds based on when ATI degradation is actually observed for that location.

In still further embodiments, an evaluated track found to not exhibit ATI degradation may have its associated write count value reduced, but not all the way back to the initial base value (e.g., zero). In this scheme, if a threshold of T=3000 is reached and the data on the track are successfully recovered without corrected errors, the write count for that track may be reduced to an intermediate level, such as 1500 (or some other suitable value). In this way, the track will be evaluated again sooner based on subsequent writes.

The criteria for refreshing a given track based on the write count value reaching the associated threshold can vary depending on the requirements of a given application. High priority data may be refreshed every time irrespective of whether ATI degradation was detected. Other data may be refreshed only if degradation is detected.

It is contemplated that the data written to the tracks will be protected against bit errors using one or more levels of error detection codes (EDC), such as Reed Solomon, BCH codes, outer codes, parity values, etc. The implemented EDC scheme will generally have the capability of detecting and correcting selected numbers of errors. Hence, if at least one corrected error is detected (and corrected by the EDC), the track is refreshed. Other degradation measurements can be used such as signal levels (e.g., observed signal to noise ratios in the readback signal, channel quality measurements, etc.).

The routine of FIG. 8 enables the system to adaptively accumulate write count values that more accurately reflect the state of the respective tracks with regard to ATI degradation. History data from the operation of the routine can be used to adaptively adjust the amounts of increments applied under different circumstances, as well as adjustments in the suitable thresholds for evaluating ATI degradation.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. A method comprising:

accumulating a write count value for a first track responsive to successive writes to a second track on a data recording medium, the write count value incremented by a different variable amount based on temperature for each of the successive writes;

obtaining readback data from the first track responsive to the write count value reaching a selected threshold value; and responsive to detection of less than a selected number of errors in the readback data, maintaining the write count value at a current value without rewriting the first track.

2. The method of claim 1, further comprising obtaining a temperature measurement indicative of an ambient temperature for each of the successive writes, selecting a variable write count increment responsive to each temperature measurement, and adding the variable write count increment to a previous write count value to generate an updated write count value.

3. The method of claim 1, further comprising defining a plurality of successive temperature ranges, assigning a different variable write count increment value to each temperature range, measuring a temperature responsive to a selected write operation applied to the second track, identifying the temperature range in which the measured temperature falls, and adding the variable write count increment value assigned to the identified temperature range to a previous write count value to derive an updated write count value for the first track.

4. The method of claim 1, further comprising defining a continuous curve that provides different values of variable write count increment values for different temperatures, measuring a temperature responsive to a selected write operation applied to the second track, using the continuous curve to identify a selected write count increment value that corresponds to the measured temperature, and adding the selected write count increment value to a previous write count value to derive an updated write count value for the first track.

5. The method of claim 1, further comprising resetting a second write count value associated with the second track to a baseline value responsive to each of the writes to the second track.

6. The method of claim 5, wherein the baseline value is zero.

7. The method of claim 1, wherein responsive to detection of a number of errors in the readback data equal to or greater than the selected number of errors, correcting a detected number of errors to provide corrected readback data, writing the corrected readback data to the first track and resetting the write count value for the first track.

8. The method of claim 1, wherein the first and second tracks are immediately adjacent so that magnetic fringing fields from a write element used to perform the successive writes to the second track encroach onto a portion of the first track.

9. The method of claim 1, the write count value accumulated in a memory by a programmable processor which selects write count increment values responsive to temperature measurement signals from a temperature sensor.

10. The method of claim 1, wherein the first and second tracks are shingled tracks.

11. The method of claim 1, wherein the different variable amount by which the write count value is successively incremented for each of the successive writes is further selected responsive to at least a selected one of a bit error rate (BER) measurement, a position error signal (PES), an aging value associated with the storage medium or an aging value associated with a duration over which data have been stored to the first track.

12. An apparatus comprising:

a data recording medium on which a plurality of concentric tracks are defined;

a data transducer having a write element adapted to write data to the tracks; and an adjacent track interference (ATI) control block which maintains, in a memory, a data structure which tabulates write counts for at least selected ones of the tracks responsive to write operations carried out by the write element, the respective tabulated write counts incremented responsive to the write operations by variable increment amounts based on temperature, the ATI control block further operative to obtain readback data from a first track responsive to the write count for the first track reaching a selected threshold, to refresh the first track responsive to a first number of errors detected in the readback data, and to not refresh the first track responsive to a smaller, second number of errors detected in the readback data.

13. The apparatus of claim 12, further comprising a temperature sensor which outputs temperature measurements indicative of temperatures adjacent the medium, the control block selecting the variable increment amounts responsive to the temperature measurements.

14. The apparatus of claim 12, wherein the ATI control block further operates to compare the tabulated write counts to at least one threshold value.

15. The apparatus of claim 12, wherein the ATI control block refreshes the first track responsive to at least one detected error in the readback data.

16. The apparatus of claim 12, wherein the ATI control block resets the write count associated with the first track responsive to the refreshing of the first track.

17. The apparatus of claim 16, wherein the ATI control block resets the write count associated with the first track without refreshing the first track.

18. The apparatus of claim 17, wherein the lower value is a first value, the ATI control block resets the corresponding tabulated write count value for each track upon the writing of data to that track to a second value, and the second value is lower than the first value.

19. A system comprising:

a storage medium on which a plurality of concentric tracks are defined;

a read/write transducer having a write element adapted to write data to the tracks and a read element adapted to read data from the tracks;

a temperature sensor adapted to output temperature measurements indicative of ambient temperatures adjacent the medium; and an adjacent track interference (ATI) control block which accumulates a write count value for a first track on the storage medium responsive to successive writes by the write element to a second track on the storage medium, and for each of the successive writes, increments the write count value for the first track by a different variable amount based on a corresponding temperature measurement from the temperature sensor, the ATI control block further operative to schedule an evaluation of data stored on the first track responsive to the accumulated write count reaching a selected threshold value, wherein responsive to a lack of degradation in readback data from the first track, the first track is not refreshed.

20. The system of claim 19, wherein the different variable amount by which the accumulated write count value for the first track is successively incremented for each of the successive writes is further selected responsive to at least a selected one of a bit error rate (BER) measurement, a position error signal (PES), an aging value associated with the storage medium or an aging value associated with a duration over which data have been stored to the first track.

* * * * *